UNITED STATES PATENT OFFICE.

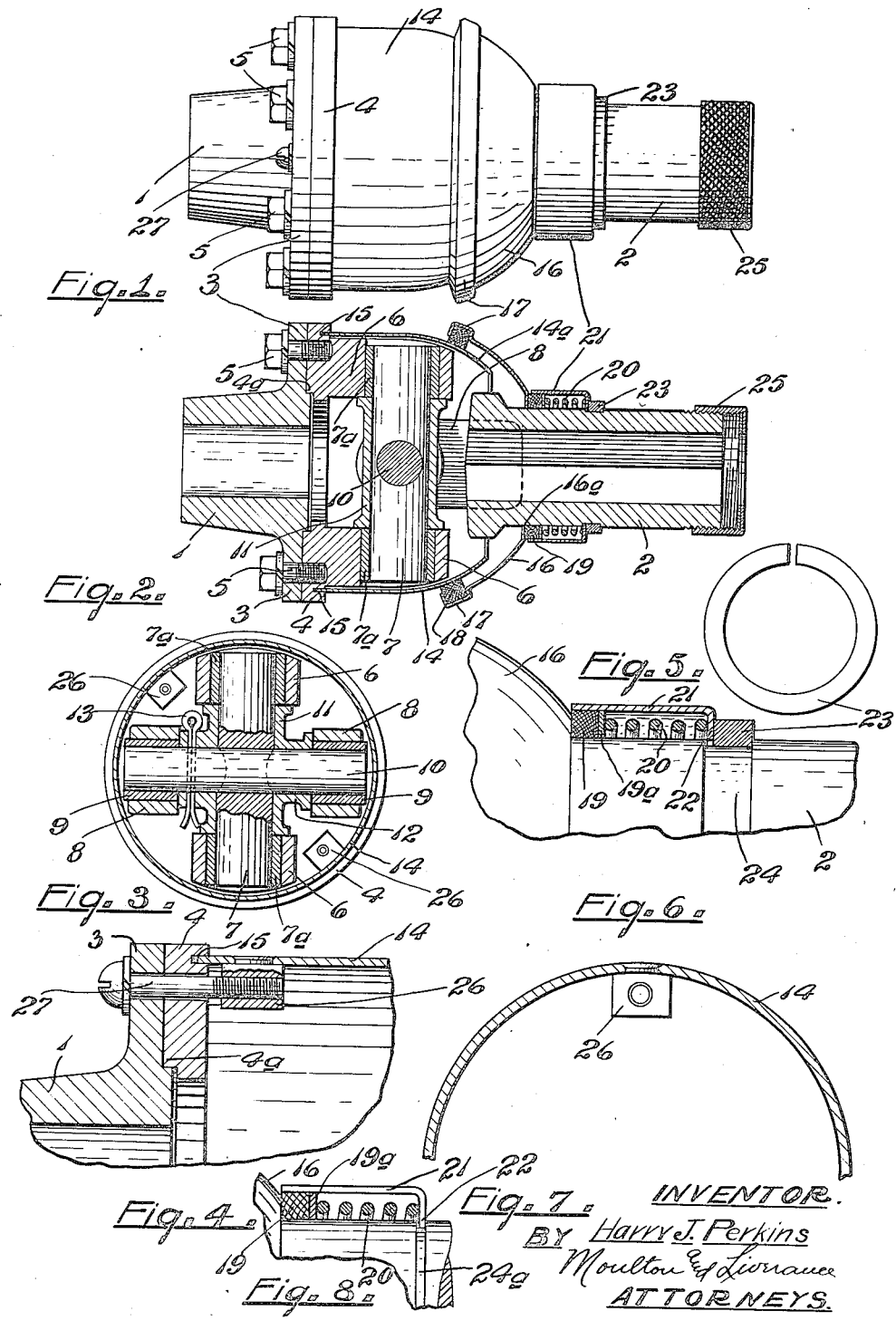

HARRY J. PERKINS, OF GRAND RAPIDS, MICHIGAN.

UNIVERSAL JOINT.

1,212,395.        Specification of Letters Patent.      Patented Jan. 16, 1917.

Application filed January 3, 1916. Serial No. 69,878.

*To all whom it may concern:*

Be it known that I, HARRY J. PERKINS, a citizen of the United States of America, residing at Grand Rapids, in the county of Kent and State of Michigan, have invented certain new and useful Improvements in Universal Joints; and I do hereby declare the following to be a full, clear, and exact description of the invention, such as will enable others skilled in the art to which it appertains to make and use the same.

This invention relates to universal joints adapted to be interposed between lengths of shafting or the like so that one shaft may be turned by the other when positioned at various changing angles thereto.

It is an object and purpose of my invention to provide a joint of this character with an inclosing casing structure so that the joint may be supplied with any suitable lubricant greatly in excess of that needed, the lubricant being retained by the inclosing casing against escape so that when the joint is once lubricated it does not need to be attended to thereafter for a long time.

Another object and purpose of the invention consists in novel features of construction relative to the inclosing casing and joint permitting each to be readily assembled and taken apart.

A still further object of the invention consists in various novel details of construction pertaining to the universal joint permitting the use of straight pins therein with a consequent saving of machine work which has heretofore been necessary in constructing joints of this character, together with an exceptional simplicity of structure of the joint that permits the assembly and locking of the parts in a very simple manner with quite as easy disassembly thereof.

Many other objects and purposes other than those specifically described will also be apparent as understanding is had of the embodiment of my invention which is shown in the accompanying drawing, and in which;

Figure 1 is a side elevation of the assembled joint. Fig. 2 is a vertical longitudinal section therethrough. Fig. 3 is a vertical transverse section taken through the pins of the joint. Fig. 4 is a fragmentary sectional detail enlarged, illustrating the connection of the casing to the joint to form a leak-proof self adjusting connection. Fig. 5 is a view of a snap ring forming one detail of the structure. Fig. 6 is a fragmentary section of a part of the joint with various parts shown in section showing one feature of construction for making the casing leak-proof. Fig. 7 is a fragmentary transverse sectional detail of a part of the inclosing casing; and Fig. 8 illustrates a modification in construction.

Like reference characters refer to like parts throughout the several views of the drawing.

In the construction of the universal joint, two socket members 1 and 2 are provided to which the ends of shafting are adapted to be secured. In practice the end of one shaft is inserted in the socket member 1 and pinned or keyed thereto in any suitable manner while the socket of the member 2 may be substantially square in cross section and receive the squared end of another shaft, permitting a limited sliding movement of the socket member with respect to the shaft yet compelling its rotation with the socket member. Any other suitable structure for attaining this end may be used. Member 1 is formed with an outwardly extending flange 3 to which is secured a ring 4 by means of cap screws 5, there being a shoulder 4ª formed entirely around the ring 4 and seating in a depression of the flange 3, the joint formed in this manner being proof against the leakage of oil therethrough and also serving to centrally locate the ring. From diametrically opposed points on the ring 4 lugs 6 extend which are bored to receive a pin 7, the ends thereof being mounted in suitable bushings 7ª carried by the lugs 6.

Spaced apart lugs 8 extend one from either side of the socket member 2 being positioned at substantially one quarter of a circle from lugs 6. These lugs are also bored near their ends and carry suitable bushings 9 which serve as bearings for the pin 10 positioned at right angles to and passing through the pin 7. It will be noted in this connection that pin 7 is of larger diameter than pin 10 and that both pins are straight whereby they may be machined and formed very quickly and easily and at a very low cost of manufacture. A center block substantially in the form of a cross and having sleeves 11 and 12 positioned at right angles to each other is located between the lugs 6 and 8, pin 7 passing through the sleeve 11 and pin 10 through the sleeve 12. At one end of the sleeve 12 a cotter pin 13 passes therethrough, also passing through the pin 10 in said sleeve. This structure is fully disclosed in Fig. 3 making a structure very quickly assembled and taken apart, all parts being locked together by the cotter pin against relative movement and with parts easily machined and manufactured.

Surrounding the lugs and pins is a shell-like casing member 14 open at both ends but having one end formed with a spherical surface 14ª. The casing member at one end seats in a groove 15 formed in the ring 4 and against suitable packing in the groove. An auxiliary casing section of substantially spherical formation and indicated at 16 is formed from sheet metal and placed over the socket member 2 and the opposite end of the casing 14, there being formed at one edge of the part 16 a retaining groove 17 in which is seated a packing ring 18 of any suitable material which bears against the surface at 14ª. At its opposite edge the section 16 is turned inwardly as shown at 16ª coming closely to the outer surface of the socket member 2 and forming a bearing surface against which a ring of packing 19 may engage. This packing is forced tightly against the part 16ª by a coil spring 20 bearing against the plate 19ª which lies between the spring and the packing 19. A housing 21 covers the spring and packing and at one end is turned inwardly to make the flange 22 against the inner side of which the opposite end of the spring 20 bears. A split ring 23 or equivalent device, is positioned around the socket member 2 and seats in a groove 24 thereof, the flange 22 turning inwardly at one side of the ring. With this structure a continuous pressure is exerted tending to adjust the section 16 and take up all wear of the packing at 18. A cap 25 is screw threaded on the end of the socket member 22 to cover the joint formed between the socket member and the shafting which may be inserted therein. Projecting inwardly at diametrically opposed points from the casing member 14 are lugs 26 which are screw threaded to receive the screws 27 which pass through the flange 3 and the ring 4 and are threaded into said lugs, it being apparent that with the tightening of these screws the member 14 is drawn very tightly against the packing in slot 15 making a leak-proof joint at this point.

In the assembly of the foregoing structure the casing 14 is placed over the joint and is rigidly connected by means of the lugs 26 and screws 27. Afterward the casing section 16 is passed over the socket member 2 until the packing 18 bears against the spherical portion 14ª. The packing ring 19, the spring 20 and the housing 21 therefor are then placed in position and the snap ring 23 forced into the groove 24 holding parts 21 and 16 in place, it being apparent, with the packing rings 19 and 18 held firmly in position, that the lubricant cannot escape by them. Furthermore it will be clear that the section 16 of the casing may move over the section 14, the packing 18 at all times contacting closely with the outer surface of the casing member 14 and maintaining the leak-proof joint at all times. The disassembly of the parts is as readily accomplished requiring merely the removal of the snap ring 23 which can be easily removed by use of any suitable tool such as a screw driver or the like. Furthermore by withdrawing the cotter pin 13 the disassembly of the parts of the universal joint may be had and the assembly thereof is quite as simple.

A slight change in construction is indicated in Fig. 8 wherein the ring 23 is eliminated, the housing 21 being split from end to end and the part 22 thereof extended into the comparatively narrow groove 24ª. It is evident from this construction that the housing 21 may be removed, the splitting thereof permitting the springing thereof from the groove 24ª which will normally retain it in place.

I claim:—

1. In combination, socket members, a ring detachably connected to one member and provided with an annular groove therein, a casing member having open ends and with the edges at one end seated in the groove, members secured to the casing member and projecting inwardly therefrom, means passed through the socket member and ring and engaging with said members to draw the casing member into the groove, a second casing member closing and partially covering the first casing member, universal joint connections between the socket members, means mounted on the other socket member for forcing the second casing member toward the first casing member, and a packing ring positioned between said casing members.

2. In combination, socket members, one member being provided with a flange having an annular recess, a ring provided with an annular projecting portion seating in the recess, means for detachably connecting the ring to the flange, said ring having projecting lugs, a straight pin mounted between the lugs, the other socket member being provided with projecting lugs, a straight pin of smaller diameter than the first-mentioned pin carried by and located between said lugs and passing through the first pin, a center block around both pins and located between the lugs, and a removable pin passing through the center block and one of the straight pins.

3. In combination, socket members, one of said members having a flange, a ring detachably secured to the flange and provided with an annular groove therein and lugs extending therefrom, a pin mounted in and between said lugs, the other socket member having lugs projecting therefrom toward the first lugs, a pin mounted in and between said last-mentioned lugs, one of said pins passing through the other, a center block surrounding the pins between the lugs and detachably secured to one of said pins, an inclosing casing covering the lugs and pins having an open end, the edges of which are seated in the groove in said ring, inwardly projecting screw-threaded members on said casing, and screws passing through the flange and ring and into said members to draw the edges of the casing into the groove.

4. In combination, socket members, a universal joint connection therebetween, a casing member having open ends detachably secured to one of the socket members and covering the universal joint, a second casing member loosely mounted on the other socket member covering the open end of the first casing member and extending partially thereover, a packing between said casing members, a second packing around said other socket member, a coil spring pressing said second packing against the second casing member, a housing for the spring and packing having a flange turned inwardly toward said other socket member, the spring bearing against the flange and a split ring around said other socket member detachably seated in a groove therein and engaging against the flange on the housing to hold the spring under compression.

In testimony whereof I affix my signature.

HARRY J. PERKINS.